(12) United States Patent
Beakley

(10) Patent No.: US 6,220,130 B1
(45) Date of Patent: Apr. 24, 2001

(54) PIPE MACHINING APPARATUS

(76) Inventor: Lane D. Beakley, 22702 Carter Moir, Katy, TX (US) 77449

(*) Notice: Subject to any disclaimer, the term of this patent is extended or adjusted under 35 U.S.C. 154(b) by 0 days.

(21) Appl. No.: 09/372,842

(22) Filed: Aug. 12, 1999

(51) Int. Cl.[7] .................................................. B23B 5/16
(52) U.S. Cl. .............................. 82/113; 82/70.1; 82/136
(58) Field of Search ........................ 82/113, 70.1, 70.2, 82/59, 136

(56) References Cited

U.S. PATENT DOCUMENTS

| 3,608,406 | * | 9/1971 | Paysinger et al. | .................. | 82/113 X |
| 5,887,501 | * | 3/1999 | Ricci | .................. | 82/113 X |

FOREIGN PATENT DOCUMENTS

0953956 * 9/1974 (CA) ....................................... 82/113
0557876 * 5/1977 (SU) ....................................... 82/113

* cited by examiner

*Primary Examiner*—Henry Tsai
(74) *Attorney, Agent, or Firm*—Bill B. Berryhill

(57) ABSTRACT

Apparatus for machining the ends of pipe, which has a clamping section insertable into a section of pipe for forcible engagement with the interior of the pipe in fixed coaxial alignment therewith and a cutting section which includes a cylindrical mast, attached to the clamping section for coaxial alignment therewith, and a cutting head assembly on which is carried one or more cutting tools. The cutting head assembly is mounted on the mast for rotation and axial movement relative thereto for moving cutting tools into and away from cutting engagement with an end of the pipe section. The apparatus cutting section mast is removably attached to the clamping section allowing removal and replacement of the clamping section.

20 Claims, 6 Drawing Sheets

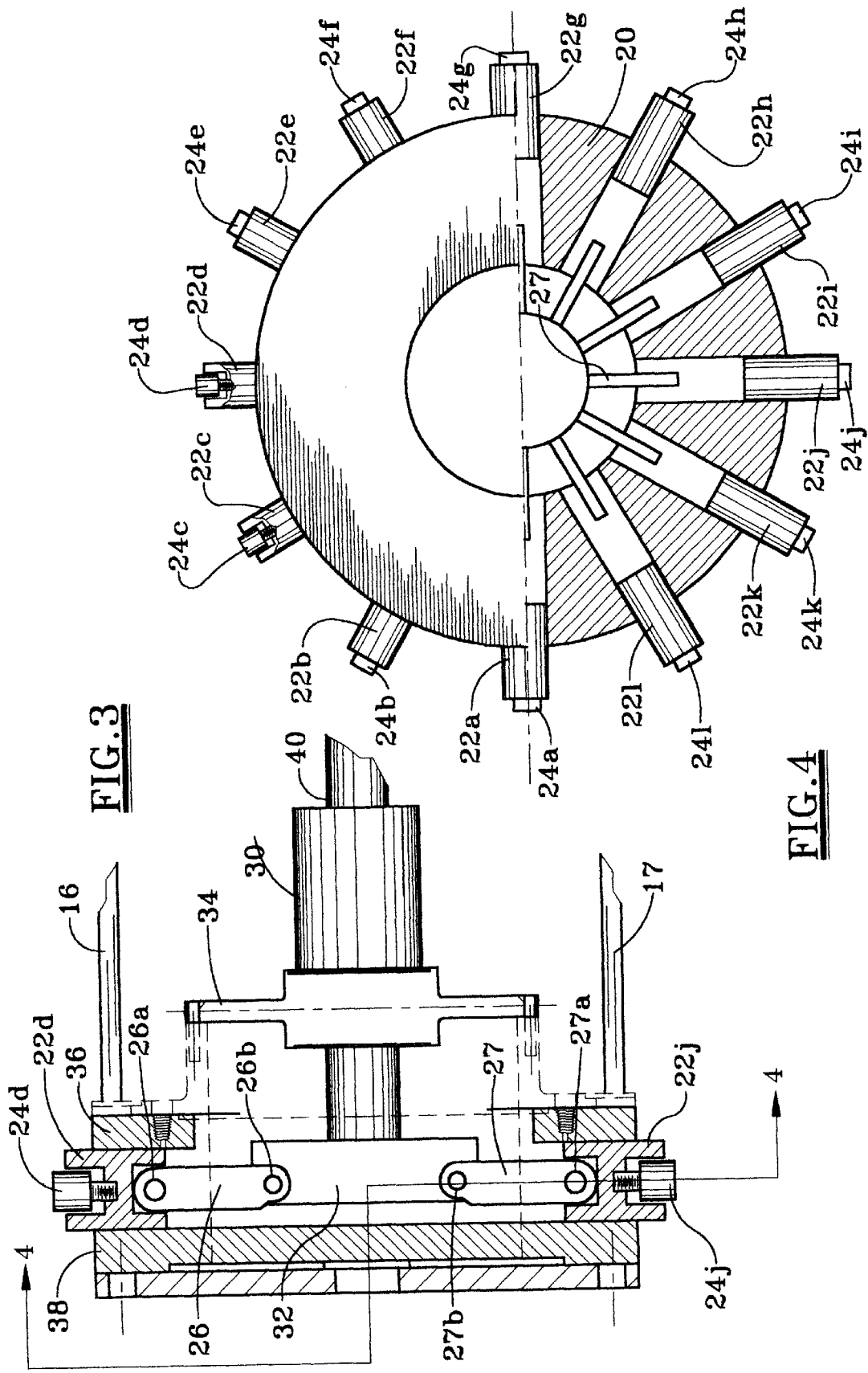

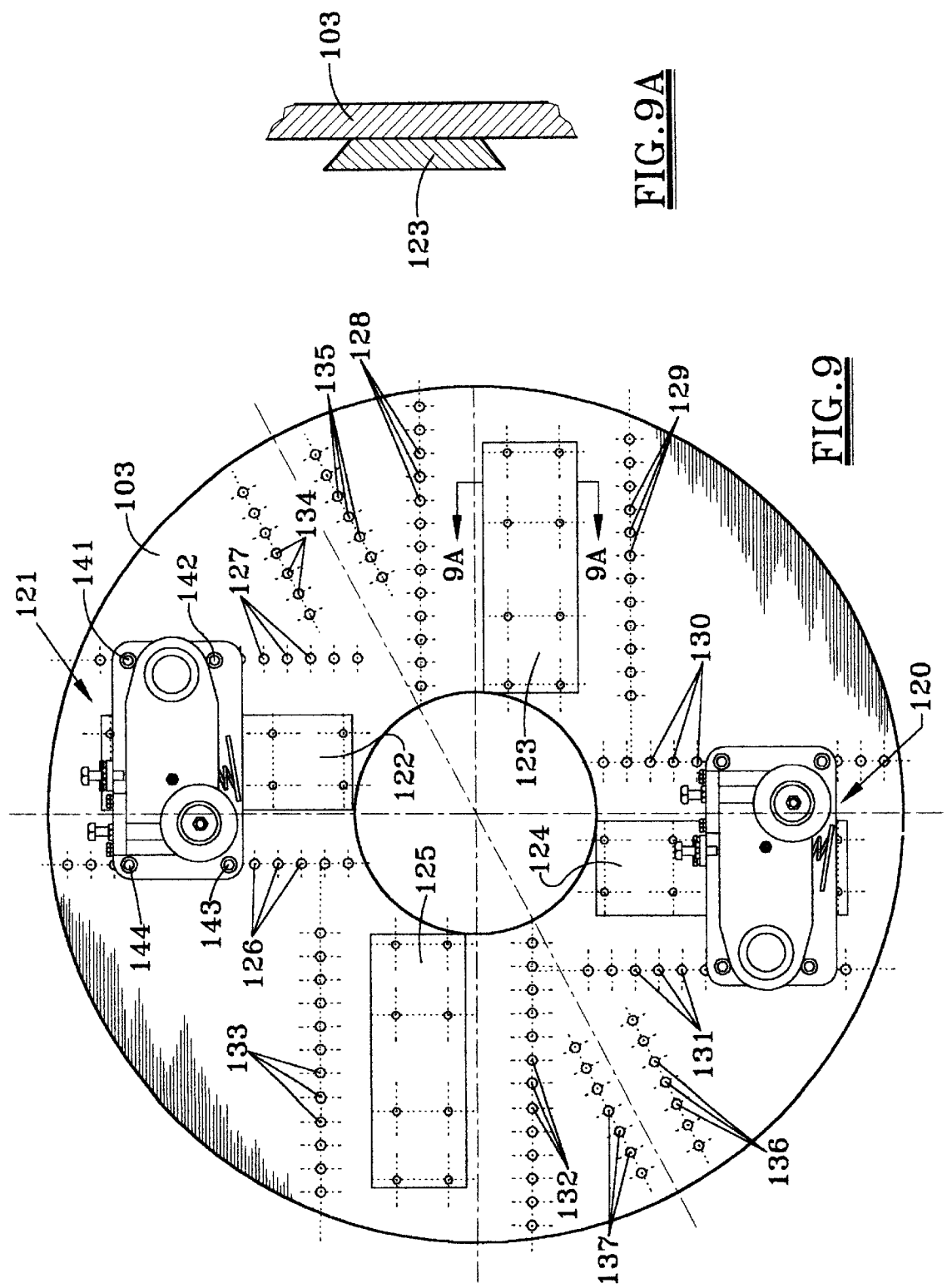

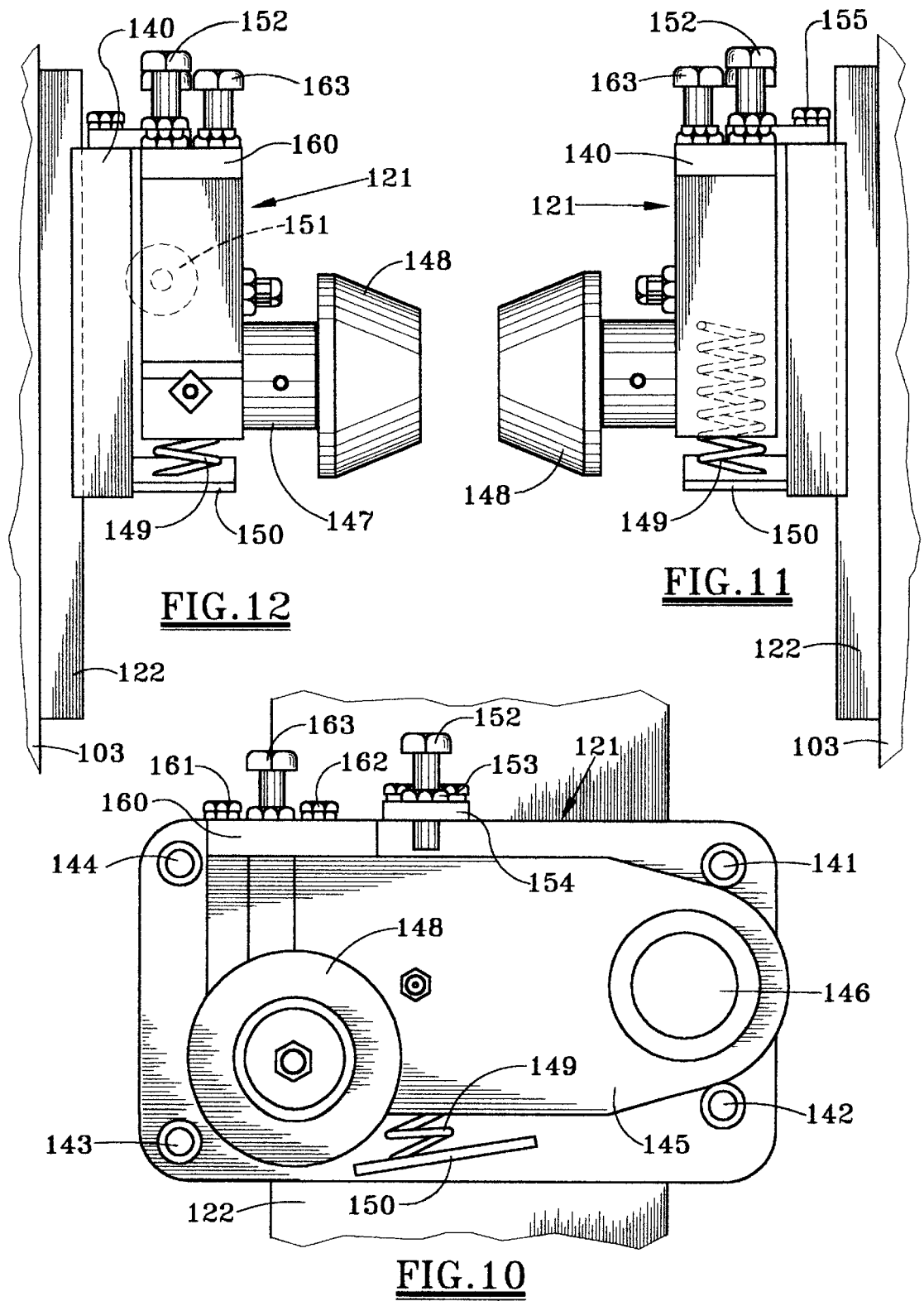

PIPE MACHINING APPARATUS

BACKGROUND OF THE INVENTION

1. Field of the Invention

The present invention pertains to pipe machining apparatus. More specifically, the present invention pertains to apparatus for cutting and/or beveling the ends of pipe sections in preparation for welding the pipe sections together in the construction of a pipeline.

2. Description of the Prior Art

In the construction of cross-country or underwater pipelines, sections of large diameter steel pipe are laid end-to-end, aligned and joined by welding in the field. The ends of the pipe are sometimes preshaped with beveled ends to provide end formations or bevels suitable for welding. In some cases, such machining is accomplished in a large stationary pipe mill. In the field, the sections of pipe are laid end-to-end, aligned and welded together.

In the past, welding of pipe joints was accomplished totally by skilled welders. More recently, automatic and semi-automatic welding equipment has become much more common. Automatic and semi-automatic welding of large diameter pipe requires that the ends of the pipe be more precisely cut. Thus, there has been an increased demand for precision machinery suitable for finishing pipe ends in the field, preparatory to welding. Such machines need to be able to grip the pipe firmly and to cut or bevel the end of the pipe in a plane which is perpendicular to the axis of the pipe. Variations in pipe wall thickness and minor deviations from true round cross-section make it desirable to design the field cutting machine so that it follows the actual contour or surface of the pipe, preferably using the interior surface as a reference.

Several pipe cutting and/or beveling machines have been developed which are suitable for in-the-field machining, preparatory to aligning and welding sections of pipe in pipeline construction. Examples of such are shown in U.S. Pat. Nos. 3,608,406; 3,733,939 and 4,126,065. Such prior art machines are typically provided with a clamping section which supports the working equipment in or on the pipe and a cutting section which usually provides a large circular plate or cutting head which rotates adjacent and parallel to the end of the pipe being cut. Plural arms, mounted on the plate, carry cutting tools and some type of power device rotates the plate as the cutting tools cut the end of the pipe. The plate is also adapted for coaxial movement with the pipe, moving the cutting tools into and away from cutting engagement with the end of the pipe. Although these prior art machines provide a number of advantages over the old cutting and welding techniques of the past, improvements are still desired.

The pipe used to form pipelines vary greatly in diameter. Although they may be smaller or larger, the vast majority of pipelines have diameters ranging from 16" to 48" in diameter. The pipe machines of the prior art are not easily adaptable for use with such a wide diameter range. The clamping and cutting sections of such machines may be suitable for a specific diameter pipe but may require substantial changes for a smaller or larger diameter pipe. For this reason, the prior art requires several machines to cover a range of 16" to 48" diameter pipe. Some of the pipe cutting machines of the prior art may be constructed in such a way as to allow the clamping section and the cutting section to be disconnected and another clamping section attached to the cutting section to accommodate a different size pipe. Since the clamping section is typically actuated by hydraulic powered devices, hydraulic lines and other connecting members must be disconnected and reconnected when the clamping sections are changed. Not only does this require considerable time and manpower it may result in loss of hydraulic fluids and creation of hazardous conditions around the working area thereof.

In addition, the cutting elements of the cutting sections of pipe machines of the prior art do not always provide smooth finishes. Some are subject to chatter and vibration while others do not provide smooth advancement of the cutting tools against the end of the pipe. A number of problems have been encountered with these cutting sections, particularly those for larger diameter pipe.

SUMMARY OF THE PRESENT INVENTION

The pipe machining apparatus of the present invention, like those of the above mentioned prior art, includes a clamping section and a cutting section. The clamping section is insertable into the end of a section of pipe for forcible engagement with the interior of the pipe in fixed coaxial alignment therewith. The cutting section comprises a cylindrical mast which is attached to the clamping section for coaxial alignment therewith and includes a cutting head assembly on which is carried one or more cutting tools. The cutting head assembly is mounted on the mast for rotation and axial movement relative thereon for moving the cutting tools into and away from cutting engagement with the end of the pipe.

The clamping section of the pipe machining apparatus of the present invention includes a plurality of pipe engaging members disposed around the clamping section for radial movement between inward non-engaging positions and outward positions in which the pipe engaging members forcibly engage the interior of the pipe placing the clamping section in fixed coaxial alignment therewith. A power device is operatively connected to the pipe engaging members for the movement thereof between their inward and outward positions. The power device is connected to a source of power, through one or more conduits centrally disposed in the cylindrical mast of the cutting section, by a two part connector; one of the parts being attached to the cylindrical mast and the other being attached to the clamping section. The connector parts are uniquely disconnectable by sliding disengagement to allow quick and easy removal and replacement of the clamping section from the cutting section. Although each clamping section is designed to accommodate a fairly wide range of pipe diameters, for example, 16" to 22" or 24" to 32" or 34" to 40" or 42" to 48", such construction allows for the utilization of a single cutting section with two or three separate clamping sections which will accommodate a wide range of pipe diameters; for example, from 16" to 32".

Another unique feature of the pipe machining apparatus of the present invention is the adjustability of each clamping section to particular pipe sizes of varying diameters and wall thickness. The pipe engaging members of the clamping sections, in preferred embodiments, are cylindrical shoes adapted for radial movement between inward non-engaging positions and outward positions in which the distal ends of the shoes engage the interior of the pipe. The distal ends of the shoes are removably attached to the remainder of the shoe allowing removal and replacement of the distal ends with distal ends of differing axial lengths to accommodate use of the clamping sections with pipes of differing internal diameters and/or wall thickness.

The cutting section of the pipe machining apparatus of the present invention is also unique in providing a cutting head assembly which includes a circular face plate member concentrically affixed to a tubular hub and to which is attached a plurality of cutting tool assemblies which include a mounting plate, a radial arm attached to the mounting plate and a guide roller affixed to the radial arm for engagement with the interior of the pipe section. The roller guides the radial arm and a cutting tool thereon for cutting engagement with the end of the pipe section. The face plate and the mounting plate are uniquely provided with cooperating slides and slide grooves allowing the cutting tool assemblies and the cutting tools attached thereto to be radially positioned on the face plate for cutting pipe sections of differing diameters. This allows the same cutting section to be used for cutting pipes of a wide range of diameters; for example, 16" to 32". In addition, the cutting tools are uniquely designed to provide very precise and efficient machining.

The pipe machining apparatus of the present invention provides for field machining and cutting of pipe and is capable of easy adjustment and adaptability for a wide range of pipe diameters utilizing the same cutting section with two or three interchangeable clamping sections which are easily removed and replaced. Each of the clamping sections is adjustable to accommodate several pipe diameters and differing wall thickness and, as stated, with a single cutting section and two or three clamping sections, quick and easy adaptability to a very wide range of pipe diameters is provided. While the apparatus is unique in adaptability to a wide range of pipe diameter, it is also unique in its construction, being relatively simple, trouble free in maintenance and operation and relatively inexpensive when compared to the number of machines of the prior art necessary to reach equal pipe diameter ranges. Many other objects and advantages of the invention will be apparent from reading the description which follows in conjunction with the accompanying drawings.

BRIEF DESCRIPTION OF THE DRAWINGS

FIG. 3 is a partial longitudinal view, similar to that of FIG. 2, showing one end of the clamping section thereof and illustrating the components thereof in a pipe engaging position;

FIG. 4 is a view of the clamping section of FIGS. 2 and 3 taken along lines 4—4 of FIG. 3, the upper half being an end view thereof and the lower half of which is in section;

FIG. 9 is an end view of a circular face plate which makes up a portion of the cutting section cutting head assembly of the pipe machining apparatus of the present invention showing two of a number of radial arm assemblies which may be attached thereto, according to a preferred embodiment of the invention;

FIG. 9A is a detailed cross-sectional view of the face plate of FIG. 9 taken along lines 9A—9A thereof illustrating a slide mounting by which radial arm assemblies are attached to the face plate for mounting at variable radial positions thereon;

FIG. 10 is a face view of a radial arm assembly, such as those shown attached to the face plate in FIG. 9, according to a preferred embodiment of the invention;

FIG. 11 is a right hand end view of the radial arm assembly of FIG. 10; and

FIG. 12 is a left hand end view of the radial arm assembly of FIG. 10.

DESCRIPTION OF THE PREFERRED EMBODIMENT

Figure 1:
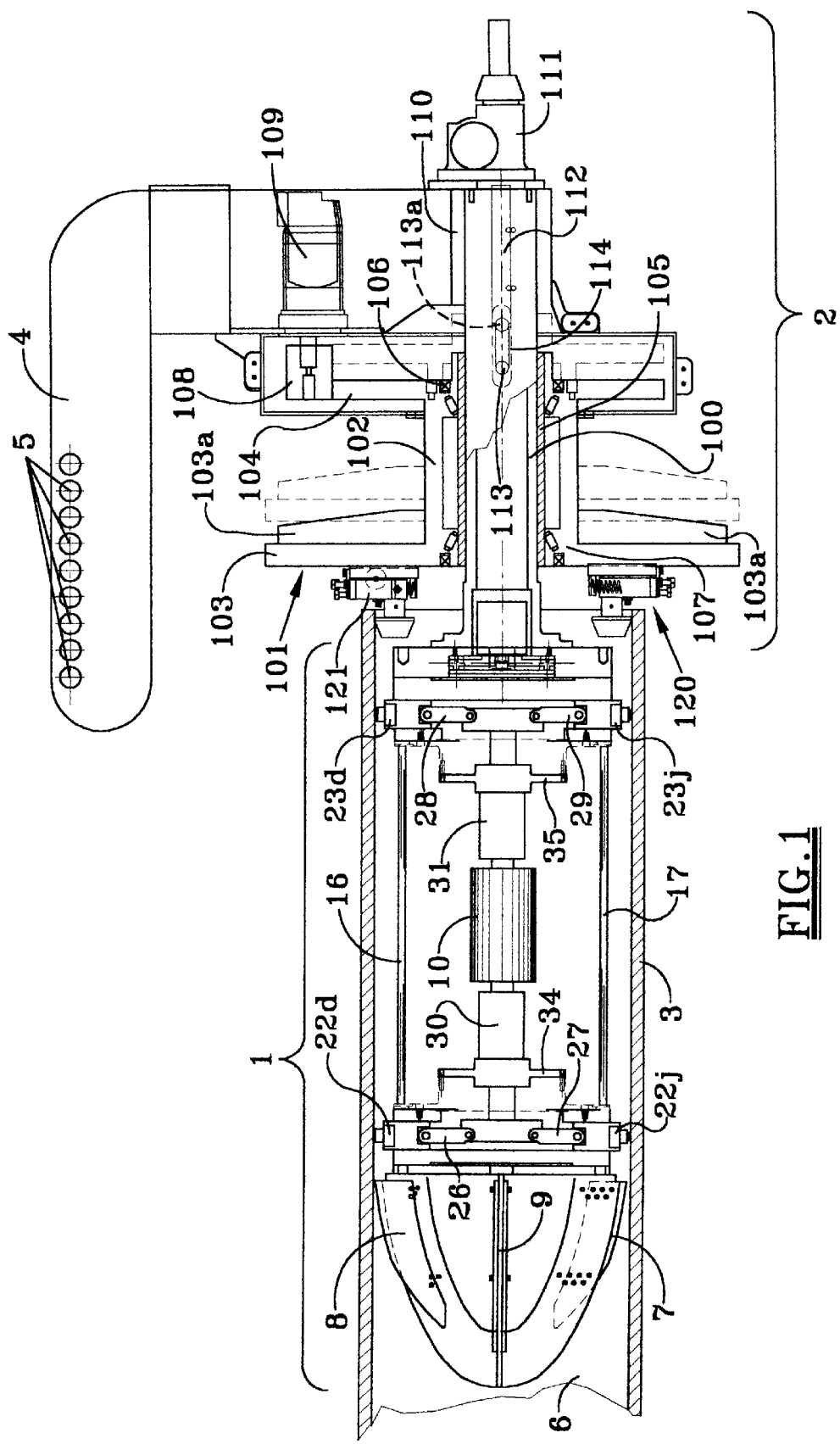
FIG. 1 is an elevation view, partially in section, of pipe machining apparatus according to a preferred embodiment of the present invention, shown in engagement with a section of pipe the ends of which are to be machined thereby.

Referring first to FIG. 1, there is shown apparatus for machining the ends of pipe. The apparatus comprises two major sections, a clamping section 1 and a cutting section 2. The clamping section 1, as will be more fully understood hereafter, is removably attached to the cutting section 2, allowing removal and replacement of the clamping section 1. Thus, the clamping section 1 and the cutting section 2, operatively connected, form the apparatus of the present invention. In addition a source of power, preferably pressurized hydraulic fluid, may be provided to operate various components of the apparatus and would be connected by suitable hydraulic hoses and like to the appropriate components. Since the source of power could be from any number of commercially available sources, it is not shown or described herein.

As shown in FIG. 1, the clamping section portion 1 of the pipe machining apparatus of the present invention has been inserted into the interior of a section of pipe 3. As it is inserted, the clamping section 1 and the cutting section 2 may be suspended from a support arm 4 which is provided with one or more holes 5 for engagement by chain, hooks or the like from a crane or lifting device of some type. It will be noted that the clamping section 1 is provided with a nose guide assembly 6 having tapered guide plates 7, 8 and 9 at ninety degree intervals thereabout for guiding and centering the clamping section 1 as it is placed in the interior of the pipe section 3. In a simplified explanation, the clamping section 1 has an extendable and retractable power device 10 (such as a piston and cylinder or ram) coaxially mounted in the clamping section 1 for extendable and retractable axial movement therein and which is operatively connected to a plurality of radially moveable members for placing the clamping section in forcible engagement with the interior of pipe section 1.

The cutting section 2, comprises a cylindrical mast 100 which is attached to the clamping section 1 for coaxial alignment therewith, projecting away from the pipe section 3. A cutting head assembly 101 on which is carried one or more cutting tools, as will be more fully understood hereafter, is mounted on the mast 100 for rotation and axial movement relative thereto for moving the cutting tools into and away from cutting engagement with an end of the pipe section 3. The operation of the clamping section 1 and the cutting section 2 are more fully described hereafter.

Figure 2:
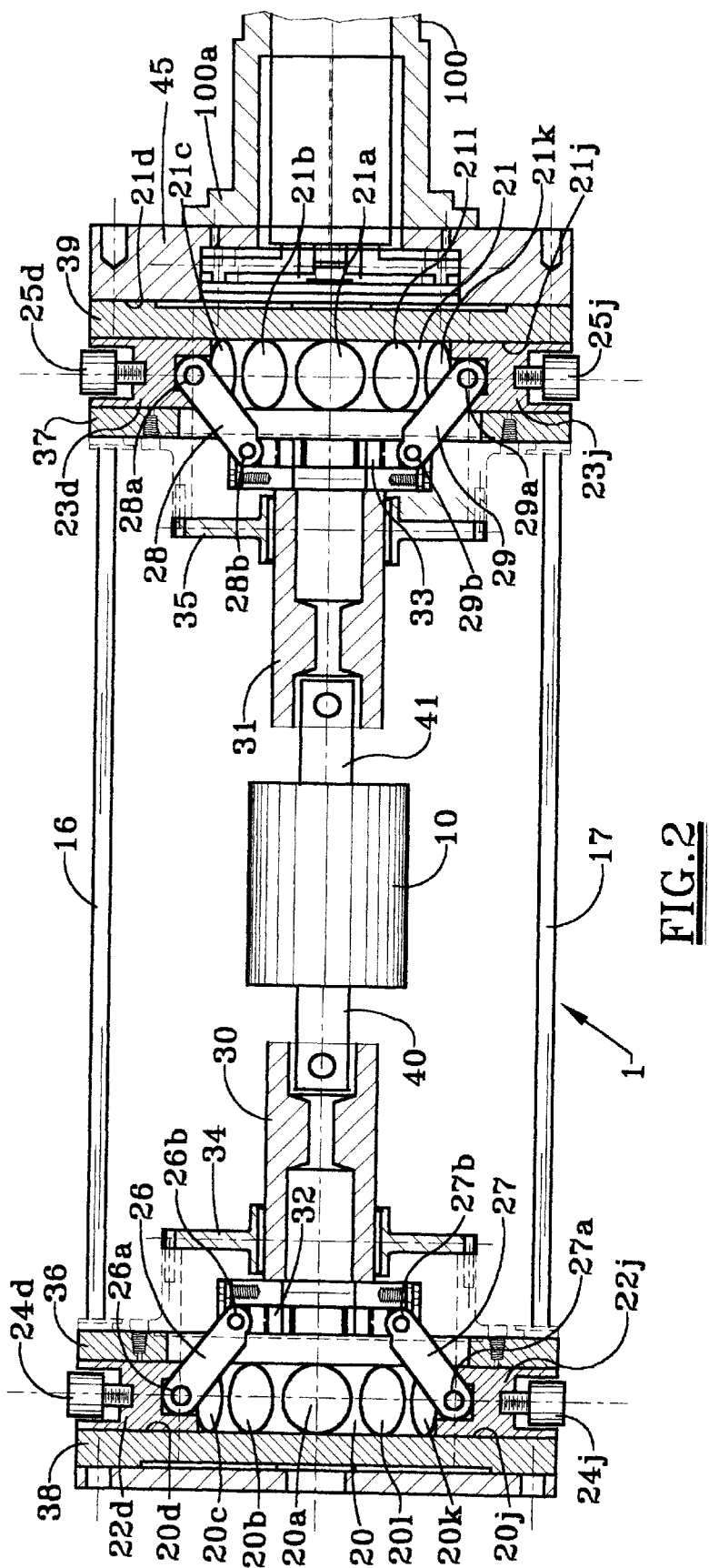
FIG. 2 is a longitudinal view, in section, of the clamping section portion of the pipe machining apparatus of FIG. 1, according to a preferred embodiment thereof, showing the clamping section in a non-engaging position.
Figure 5:
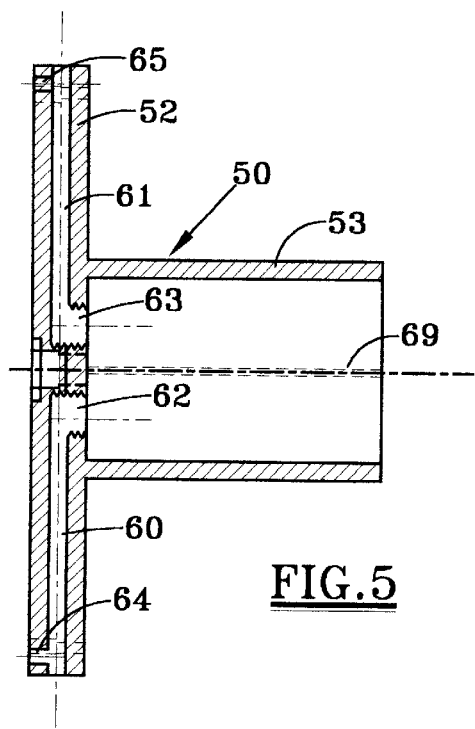
FIGS. 5 and 6 are longitudinal section and end views, respectively, of one part of a two part connector by which the clamping and cutting sections of the pipe machining apparatus of the present invention are connected.
Figure 7:
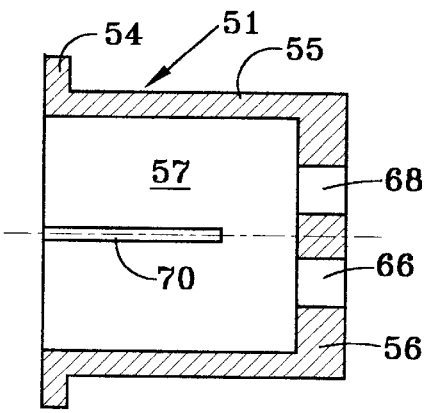
FIGS. 7 and 8 are longitudinal section and end views, respectively, of another corresponding part of the two part connector by which the clamping and cutting sections of the apparatus of the present invention are connected, according to a preferred embodiment thereof.
Figure 6:
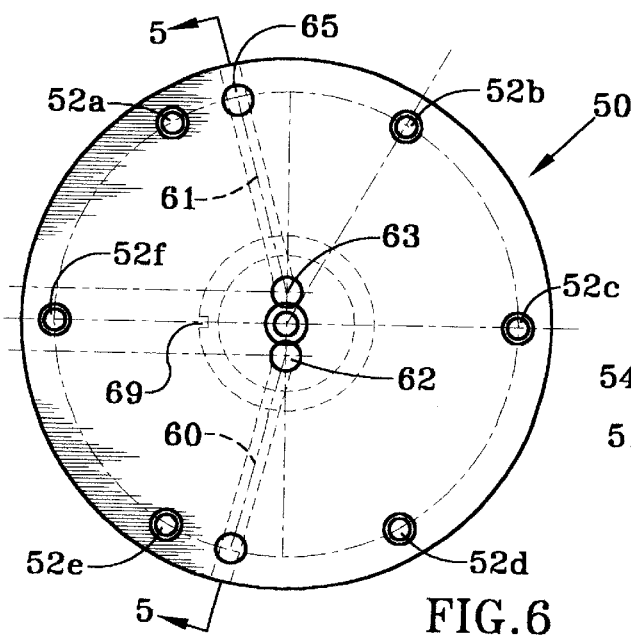
Figure 8:
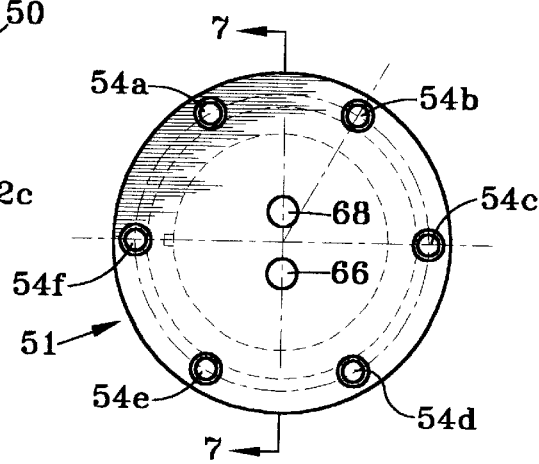

Referring now also to FIGS. 2, 3 and 4, the clamping section 1 will be described in greater detail. There are a pair of circular cylinder heads 20, 21 sandwiched between plates 36, 38 and 37, 39, respectively. Plates 36 and 37 are connected by rods 16, 17, etc. at opposite ends of the clamping section 1. Each of these circular cylinder heads 20, 21 is provided with a plurality, twelve in the exemplary embodiment, of radially disposed cylindrical ports 20a–20l and 21a–21l (20e, 20f, 20g, 20h, 20i, 21e, 21f, 21g, 21h, and 21i do not show in the drawing since the drawing is in section) in each of which is mounted for sliding radial movement, a cylindrical shoe 22a–22l and 23a–23l, respectively. For a clearer understanding of FIG. 2, only the upper and lower cylindrical shoes 22d, 22j, 23d and 23j, respectively, are shown, the other cylindrical shoes being removed. The outer ends of each of the cylindrical shoes 22a–22l and 23a 23l are drilled and tapped for threaded engagement with corresponding cap head screws 24a–24l and 25a–25l which form the distal ends of the cylindrical shoes. If desired, these screws 24a–24l and 25a–25l may be removed and replaced with screws having longer heads or longer shafts and surrounded by tubular collars to lengthen the cylindrical shoe for engagement with pipe sections of greater internal diameter.

As best shown in FIGS. 2 and 3, each of the cylindrical shoes, 22a–22l and 23a–23l are pivotally attached by pins 26a, 27a, 28a, 29a at proximal ends thereof to one end of a link member, such as link members 26, 27, 28, 29 shown in FIGS. 2 and 3. The opposite end of the link members, 26, 27, 28, 29 are pivotally attached, within radial slots provided therefor, to a two part assembly or spider which includes spider shafts 30, 31 and retainer rings 32, 33. The spider shaft and spider rings retain transverse pins 26b, 27b, 28b, 29b which engage holes in the proximal ends of the links 26, 27, 28, 29. The spider shafts 30 and 31 are connected to rods 40 and 41 of the extendable and retractable hydraulic ram 10. The spider shafts 30 and 31 are centrally disposed in tubular hubs of circular guide members 34 and 35 which are in turn attached to the circular plates 36, 37, attached to the inner faces of cylinder heads 20 and 21.

When the hydraulic ram or power device 10 is in the retracted position of FIG. 2, the spider assemblies 30, 32 and 31, 33 are in closer spaced positions and the link members 26, 27, 28, 29 are in inclined positions so that the cylindrical shoes, i.e. 22d, 22j, 23d, 23j, attached to the link members 26–29 are disposed in inward non-engaging positions such as the positions illustrated in FIG. 2. However, when fluid pressure is applied to the hydraulic power device 10 causing extension thereof, the spider assemblies 30, 32 and 31, 33 move, in opposite directions, away from each other into further spaced positions, such as illustrated for the spider assembly 30, 32 in FIG. 3, so that each of the link members, e.g. 26, 27, are in substantially less inclined and as illustrated in FIG. 3 in substantially radial alignment forcing the cylindrical shoes attached thereto, e.g. 22d, 22j, and the distal ends thereof provided by screws 24d, 24j into outward forcible engagement with a pipe section, such as the pipe section 3 illustrated in FIG. 1, to firmly fix the clamping section 1 and the cutting section 2 in coaxial alignment with the pipe section. Reversal of fluid flow to the hydraulic device 10 causing the retraction thereof will of course return the links 26, 27 and 28, 29 to the positions of FIG. 2 moving cylindrical shoes attached thereto radially inward, again to the non-engaging positions of FIG. 2.

Of course, the extendable and retractable power device 10 is hydraulically operated and supplied with pressurized fluid. This pressurized fluid is supplied from one or more conduits centrally disposed in the cylindrical mast 100. The cylindrical mast 100, as shown in FIGS. 1 and 2 is a hollow tubular member at one end of which is provided a flange portion 100a having holes (not shown) radially disposed thereabout through which threaded members (not shown) may be placed for threaded engagement with corresponding threaded and tapped holes (not shown) in a flange 45 attached to the plate 39 at the corresponding end of the clamping section 1.

The necessary fluid connection between the clamping section 1 and the cutting section 2 is provided by a unique two part fluid connector illustrated in FIGS. 1 and 2, but best shown in FIGS. 5–8. The fluid connector is made up of two primary components 50, 51, one of these components or parts, part 50, is attached to the clamping section 1 and the other component or part 51 is attached to the cutting section 2. The connector part 50 comprises a circular flange portion 52 and a tubular extension 53. The flange portion 52 is provided with holes 52a–52f through which threaded bolt members may be placed for threaded engagement with corresponding drilled and tapped holes (not shown) in the end flange 45 of clamping section 1.

The other member 51 has a small flange 54, a tubular body 55 and a substantially closed end 56. The body 55 is insertable into a counterbored portion of the central mast 100 and the member 51 is fixed to the end of the central mast 100 by threaded members which are inserted through holes 54a–54f in the flange 54 for threaded engagement with corresponding drilled and tapped holes provided around the central mast flange 100a. The connector member 51 thus forms a cylindrical cavity 57 which the tubular extension 53 of the connector part 50 may coaxially engage in a sliding fit.

It will be noted that the flange 52 of the part 50 is provided with radial passages 60 and 61, inwardly these passages communicate 10 with ports 62 and 63. Outwardly these passages communicate with ports 64, 65. The ports 64, 65 may be connected to hydraulic hoses (not shown) the opposite ends of which are connected to the hydraulic power device 10 of FIGS. 1 and 2. The ports 62, 63 may be provided with quick connect and disconnect hydraulic connectors (not shown) for connection and disconnection with corresponding components of quick connect and disconnect assemblies (not shown) mounted in corresponding ports 66, 68 provided in the part 51. To assure that the ports 62, 63 and 66, 68 and the corresponding quick connect and disconnect hydraulic fittings provided therein are in proper registration upon connection, longitudinal keyways 69 and 70 may be provided in which a key (not shown) may be placed for proper alignment thereof.

The connector part 50 is attached to the clamping section and the connector part 51 is attached to the cutting section 2. The cutting section will now be described in greater detail with further reference to FIGS. 9–12. As previously mentioned with reference to FIG. 1, the cutting section 2 comprises a cylindrical mast 100. The cylindrical mast 100 is tubular and as stated, the part 51 of the two part connector assembly is centrally disposed at one end thereof. As also previously mentioned with reference to FIG. 2, the cylindrical mast 100 is provided with a flange portion 100a, the cutting section 2 and the clamping section 1 being connected by studs or bolts (not shown) which engage holes (not shown) radially disposed around the flange 100a and corresponding holes (not shown) provided in the end flange 45 of the clamping section 1 (see FIG. 2). These members can also be easily disconnected simply by removing the connecting members and slidingly disengaging the tubular extension 53 of the connector part 50 from the cylindrical cavity 57 of the connector part 51 (see FIGS. 5–8).

As previously stated, a cutting head assembly 101, on which is carried one or more cutting tools, is mounted on the cylindrical mast 100 for rotation and axial movement relative thereto, moving one or more cutting tools into or away from cutting engagement with the end of the pipe section 3. The cutting head assembly 101 comprises a tubular hub 102 and a large circular plate member 103 at one end thereof. Radial support ribs 103a, welded to hub 102 and plate member 103, support the plate against bending. The opposite end of the tubular hub 102 is affixed to the a large gear member 104. A tubular bronze bushing 105 surround the cylindrical mast 100 and is internally sized to allow axial movement thereof on the cylindrical mast 100. Bearing assemblies 106 and 107 at opposite ends of the hub 102 allow rotation of the hub 102, the face plate 103 and the gear 104 attached thereto. Engaging the gear 104 is a drive gear 108 attached to the shaft of a hydraulic motor 109 which is supplied by a source of hydraulic power (not shown).

Coaxially aligned with the cylindrical mast 100 and attached to a tubular mounting 110 of the support arm 4 is a hydraulically operated ball screw actuator 111. The actuator 111 is supplied with hydraulic fluid from the source of hydraulic power (not shown). Rotation of the ball screw actuator 111 by hydraulic fluid translates rotational movement to axial movement of a portion of the actuator which is attached to an extender rod 112. The distal end of the rod 112 is provided with a pin member 113 which extends transversely through longitudinal slots 114 provided on opposite sides of the cylindrical mast 100 for engagement with corresponding recessed holes (not shown) provided on the interior of the bronze bushing 105. The ball screw actuator 111 effects coaxial movement (reciprocation) of the tubular bushing 105 and therefore of the cutting head assembly 101 relative to the cylindrical mast 100. When the apparatus is first aligned with pipe section 3, the cutting head assembly 101 would be in the dotted or hidden line position illustrated in FIG. 1. Note that the pin 113 would be at the opposite end of the slots 114 as illustrated at 113a. The ball screw actuator 111 would then feed the cutting head assembly 101 to the left, as illustrated by the solid line position thereof in FIG. 1. As this occurs, the gear 104 gradually moves from the dotted line position of FIG. 1 to the solid line position illustrated therein. Thus rotation and axial movement of the cutting head assembly 101 may occur simultaneously.

Mounted on the circular plate 103 of the cutting head assembly 101 is one or more cutting tool assemblies 120, 121. In the illustrated embodiments of FIGS. 1 and 9 two such cutting tool assemblies 120, 121 are shown. As many as six cutting tool assemblies could be attached to the face plate 103 illustrated in FIG. 9. As best seen in FIG. 9, the face plate 103 is provided with, in the exemplary embodiment, four dovetail slides 122, 123, 124 and 125. The slides 122–125 are fastened to the plate 103 and have a cross section, as best seen in FIG. 9a, which is sized to slidingly engage a corresponding groove provided in the mounting plates of cutting tool assemblies 120, 121. It will also be noted that there are a series of threaded holes provided on opposite sides of the slides 122, 123, 124 and 125. They will be referred to as series 126, 127, 128, 129, 130, 131, 132, 133. Each slide 122–125 thus has a corresponding pair of aligned hole series. For example, slide 122 has a pair of hole series 126, 127. The holes of each series, e.g. series 126 and 127, are at pre-determined spaced intervals. However, it will be noted that the center of the holes in series 126 are equally offset, relative to slide 122, from the centers of the holes of series 127. As will be more fully understood hereafter, this allows for more flexibility and placement of the cutting tool assemblies 120, 121 for a particular diameter and wall thickness of pipe being machined thereby. It will also be noted that other hole series 134, 135, 136 and 137 are provided on the plate 103. Although these holes 134–137 do not correspond with a slide mounting, they can also be used for the mounting of tool assemblies of different types.

Referring now to especially FIGS. 10–12, the tool assembly 121 will be described in greater detail. The tool assembly 121 has a mounting plate 140. The mounting plate 140 is provided on the rear face thereof with a dovetail slide groove which corresponds with the slide 122 and allows sliding radial movement of the entire tool assembly 121 relative to the plate 103 so that the tool assembly 121 can be placed at the desired radial position thereon. When the proper position is reached, fasteners 141, 142, 143, 144, may be inserted through holes provided in the plate 140 and threadedly engaged with a corresponding hole in the hole series 126, 127. The entire tool assembly 121 then becomes fixed at a particular pre-selected position.

A radial arm 145 is connected by a pivot connection 146 to the mounting plate 140. Mounted at the distal end of the radial arm for rotation on a bearing assembly 147 is a tapered guide roller 148. The radial arm 145 and thus the guide roller 148 are biased in a radially outward direction by a spring 149 one end of which is received in a cylindrical recess in the radial arm 145 and the opposite end of which bears against a spring stop 150 affixed to the mounting plate 140. Outward movement of the radial arm 145 from the biasing of spring 149 is limited by a stop bolt 152 and lock nut 153 attached to an extension 154 which is attached by another bolt or screw 155 to the mounting plate 140.

Mounted on a shaft fixed in any suitable manner to the back of the radial arm 145 is a roller 151 the rotating axis of which is substantially perpendicular to the axis of the pivot connection 146. The roller 151 rides against the front of the mounting plate 140 to aid in guiding the radial arm 145 as it pivots about the pivot connection 146. A hardened surface may be provided on the mounting plate 140 for engagement with the roller 151.

A tool post block 160 and cooperating connectors 161, 162, 163 permit the attachment of a cutting tool (not shown) to the end of distal end of the radial arm 145. Varied numbers and shapes of cutting tools are selected for desired end surfaces to be cut on pipe sections.

Referring now to all of the drawings, operation of the apparatus of the present invention will be described. Initially, a clamping section 1 for a particular range of pipe, e.g. 24" to 30", is attached to the cylindrical mast 100 of the cutting section 2. As previously indicated, this is accomplished simply by telescopically engaging the tubular extension 53 of the connector part 50 with the cylindrical cavity 57 of the connector part 51, the connector part 50 being attached to the clamping section 1 and the connector part 51 being connected to the mast 100 of the cutting section 2. Then the flange of the cylindrical mast 100 is connected to the corresponding end flange 45 of the clamping section 2 (see FIG. 2). At this point all hydraulic conduits to and from the hydraulic power device 10 of the clamping section 1 and the hydraulic motor 109 and actuator 111 of the cutting section 2 are connected to a source of pressurized hydraulic fluid.

The entire apparatus, clamping section 1 and cutting section 2, supported from the support arm 4, is then guided to the pipe section 3 and the clamping section 1 guided into the end of the pipe section 3 to the proper location therein. Hydraulic pressure is then supplied to the extendable and retractable hydraulic power device 10 causing it to extend and move the clamping section components from the non-engaged position of FIG. 2 to the engaged positions of FIGS.

1, 3 and 4 so that the distal ends of the cylindrical shoes 22a–22l and 23a–23l forcibly engage the interior of the pipe to place the apparatus in fixed coaxial alignment therewith.

In this initially engaged position, the cutting head assembly 101 will be in the dotted or dashed line position of FIG. 1. As the procedure continues, the motor 109 turns the drive gear 108 which in turn begins to rotate to gear 104 and the entire cutting head assembly 101 to which it is attached. The ball screw actuator 111 is actuated causing the cutting head assembly 101 to move on the cylindrical mast 100 from the dotted line position toward the solid line position of FIG. 1. The guide rollers of the cutting tool assemblies, such as the guide roller 148 of cutting tool assembly 121, engage the end of the pipe section 3 and the radial arm 145 is pivoted inwardly due to the tapered surface of the rollers 148. The cutting head assembly 101 continues to move toward the end of the pipe section 3 until the cutting tool or tools mounted on the radial arm 145 engages the end of the pipe and begins cutting the end of the pipe. The cutting tools are selected so that a proper slant bevel or the like is cut on the end of the tool as the cutting head assembly 101 continues to move toward the end of the pipe section 3.

When cutting is complete, rotation of the ball screw actuator 111 is reversed causing the cutting head assembly 101 to move in the opposite direction, i.e. from the solid line position to the dotted line position shown in FIG. 1. Once the cutting head assembly 101 is completely retracted, the power device 10 will be reversed, moving the clamping section components back to the positions indicated in FIG. 2 so that the cylindrical shoes are withdrawn and the clamping section 2 disengaged from the walls of the pipe section 3. The entire apparatus may then be disengaged from the pipe section 1 and moved to another pipe section for similar operation2.

The same clamping section 1 and cutting section 2 may be used on pipe of different wall thicknesses and diameter within a range of diameters, say from 24 to 30", simply by changing the distal ends of the clamping shoes and by repositioning the cutting tool assemblies 120, 121 on the plate 103. If it is desired to use the apparatus with a substantially smaller or larger range of pipe, for example, 16"–22" or 24"–32", it may be necessary to provide the cutting section 2 with a different clamping section. In this case it is only necessary to disconnect the flange 100a of the cylindrical mast 100 from the end plate 45 of the clamping section 2 and telescopically disengage the two part connector 50, 51. Then another clamping section for the desired range of pipe may be connected to the cutting section 2 in the same manner. The same cutting section 2 is used by simply repositioning cutting tool assemblies 120, 121 at different radial positions on the plate member 103.

Thus, the apparatus of the present invention is extremely versatile and easy to operate and maintain. It is especially practical and economical. One cutting section and two or three clamping sections may replace several machines of the prior art.

Although a preferred embodiment of the invention has been described herein, many variations will be apparent to those skilled in the art. Accordingly, it is intended that the scope of the invention be limited only by the claims which follow.

What is claimed is:

1. Apparatus for machining the ends of pipe, said apparatus comprising a clamping section and a cutting section; said clamping section being insertable into a section of pipe for forcible engagement with the interior of said pipe in fixed coaxial alignment therewith, said clamping section comprising a plurality of pipe engaging members disposed around said clamping section for radial movement between inward non-engaging positions and outward positions in which said pipe engaging members forcibly engage the interior of said pipe to place said clamping section in said fixed coaxial alignment therewith, said clamping section also comprising a power device operatively connected to said pipe engaging members for said movement thereof between said inward non-engaging positions and said outward engaging positions;

said cutting section comprising a cylindrical mast, attached to said clamping section for coaxial alignment therewith and projection away from said pipe section, and a cutting head assembly on which is carried one or more cutting tools, said cutting head assembly being mounted on said mast for rotation and axial movement relative thereto for moving said one or more cutting tools into and away from cutting engagement with an end of said pipe section;

said apparatus being further characterized in that said cutting section mast is removably attached to said clamping section allowing removal and replacement of said clamping section.

2. Pipe machining apparatus as set forth in claim 1 in which said power device is removably connected to a source of power through one or more conduits centrally disposed in said cylindrical mast and a corresponding portion of said clamping section to which said cylindrical mast is removably attached.

3. Pipe machining apparatus as set forth in claim 2 in which said one or more conduits through which said power device is supplied with power is connected by a two part connector, a first of said connector parts providing a cylindrical cavity, the second of said connector parts providing a tubular extension which is coaxially engageable with said cylindrical cavity in a sliding fit, one of said first and second connector parts being attached to said cylindrical mast and the other of said connector parts being attached to said clamping section, said connector being disconnectable by sliding disengagement of said tubular extension from said cylindrical cavity upon removal of said clamping section from said cutting section mast.

4. Pipe machining apparatus as set forth in claim 3 in which said cylindrical mast is tubular and in which said first part of said connector is centrally disposed at one end of said tubular cylindrical mast, said second part of said connector being centrally disposed at one end of said clamping section and through which said source of power is connected to said power device.

5. Pipe machining apparatus as set forth in claim 4 in which said one end of said clamping section comprises a circular mounting flange and in which said tubular mast is provided at said one end thereof with a flange, said mast flange being attachable to said circular mounting flange by threaded connector means, unthreading of said connector means allowing said removal of said clamping section from said cutting section mast.

6. Apparatus for machining the ends of pipe, said apparatus comprising a clamping section and a cutting section;

said clamping section being insertable into a section of pipe for forcible engagement with the interior of said pipe in fixed coaxial alignment therewith;

said cutting section comprising a cylindrical mast, attached to said clamping section for coaxial alignment therewith and projection away from said pipe section, and a cutting head assembly on which is carried one or more cutting tools, said cutting head assembly being mounted on said mast for rotation and axial movement relative thereto for moving said one or more cutting tools into and away from cutting engagement with an end of said pipe section;

said apparatus being further characterized in that said clamping section comprises an extendable and retractable power device coaxially mounted in said clamping section for extendable and retractable axial movement therein and at opposite ends of which are a pair of circular cylinder heads around each of which are provided a plurality of radially disposed cylinders in which are cylindrical shoes adapted for radial movement between inward nonengaging positions and outward positions in which distal ends of said shoes may engage the interior of said pipe, each of said shoes being pivotally attached at proximal ends thereof to one end of a link member, the other end of said link member being pivotally attached to one of a pair of spider members which are attached to opposite ends of said extendable and retractable power device, said spider members being moveable between close spaced positions and further spaced positions in response to said extendable and retractable axial movement of said power device, each of said link members being in inclined positions when said spider members are in close spaced positions so that said cylindrical shoes are in said inward nonengaging positions, each of said link members being in substantially less inclined positions when said spider members are in said further spaced positions so that said cylindrical shoes are in said outward positions for placing said clamping section in said forcible engagement with the interior of said pipe.

7. Pipe machining apparatus as set forth in claim 6 in which the distal end of each of said cylindrical shoes is removably attached to the remainder of said shoe allowing removal and replacement of said distal ends with distal ends of differing axial lengths to accommodate use of said clamping section with pipes of differing internal diameters.

8. Pipe machining apparatus as set forth in claim 7 in which said distal ends of said cylindrical shoes comprises a head member and a threaded shaft, said threaded shaft being engageable with a corresponding threaded hole coaxially provided in the end of said remainder of said shoe to which said distal end is removably attached.

9. Pipe machining apparatus as set forth in claim 8 in which each of said cylindrical shoes is provided with a tubular collar member which, when placed around said shaft of said distal end, lengthens said cylindrical shoe.

10. Pipe machining apparatus as set forth in claim 6 in which said extendable and retractable power device is hydraulically operated by fluid from a source of pressurized fluid, said source of pressurized fluid being connected to said power device by one or more conduits centrally disposed in said cylindrical mast and a corresponding portion of said clamping section to which said cylindrical mast is removably attached.

11. Pipe machining apparatus as set forth in claim 10 in which said one or more conduits through which said hydraulically operated power device is supplied with pressurized fluid is connected by a two part fluid connector, a first of said connector parts providing a cylindrical cavity, the second of said connector parts providing a tubular extension which is coaxially engageable with said cylindrical cavity in a sliding fit, one of said first and second connector parts being attached to said cylindrical mast and the other of said connector parts being attached to said clamp section, said fluid connector being disconnectable by sliding disengagement of said tubular extension from said cylindrical cavity upon removal of said clamping section from said cutting section mast.

12. Pipe machining apparatus as set forth in claim 11 in which said cylindrical mast is tubular and in which said first part of said fluid connector is centrally disposed at one end of said tubular cylindrical mast, said second part of said fluid connector being centrally disposed at one end of said clamping section and through which said pressurized fluid may be conducted to said hydraulically operated power device.

13. Pipe machining apparatus as set forth in claim 12 in which said one end of said clamping section comprises a circular mounting flange and in which said tubular mast is provided at said one end thereof with a flange, said mast flange being attachable to said circular mounting flange by threaded connector means, unthreading of said connector means allowing said removal of said clamping section from said cutting section mast.

14. Apparatus for machining the ends of pipe, said apparatus comprising a clamping section and a cutting section;

said clamping section being insertable into a section of pipe for forcible engagement with the interior of said pipe in fixed coaxial alignment therewith;

said cutting section comprising a cylindrical mast attached to said clamping section for coaxial alignment therewith and projection away from said pipe section, and a cutting head assembly on which is carried one or more cutting tools, said cutting head assembly being mounted on said mast for rotation and axial movement relative thereto for moving said one or more cutting tools into and away from cutting engagement with an end of said pipe section;

said apparatus being further characterized in that said cutting head assembly comprises a tubular hub surrounding said cylindrical mast, one end of said hub being concentrically affixed to a gear member engageable by a drive gear attached to a rotating power device for said rotation of said cutting head assembly, the opposite end of said tubular hub being concentrically affixed to a circular face plate member on which said one or more cutting tools is carried for cutting engagement with said end of said pipe section, each of said one or more cutting tools being provided by a cutting tool assembly which includes a mounting plate by which said cutting tool assembly is attached to said face plate member, a radial arm attached to said mounting plate by a pivot connection and to which said cutting tool is removably attached, and a guide roller affixed to said radial arm for engagement with the interior of said pipe section to guide said cutting tool for said cutting engagement with said end of said pipe section, one of said face plate and said tool assembly mounting plate being provided with an elongated slide groove and the other of which is provided with a cooperating slide, allowing said tool assembly and said cutting tool attached thereto to be radially positioned on said face plate for cutting pipe sections of differing diameters.

15. Pipe machining apparatus as set forth in claim 14 in which said tool assembly mounting plate, after preselected positioning with said cooperating slide and slide groove, is rigidly fixed to said face plate by cooperating fastening members.

16. Pipe machining apparatus as set forth in claim 14 in which said cutting tool assembly comprises a spring member engaging said mounting plate and said radial arm, biasing said radial arm and said guide roller into outward radial engagement with said pipe section interior.

17. Pipe machining apparatus as set forth in claim 14 in which said cutting head assembly comprises a tubular sleeve member on which said tubular hub rotates, said sleeve member surrounding said cylindrical mast for sliding movement thereon, said sleeve member being attached to another power device for axial movement thereof effecting said axial movement of said cutting head assembly while said cutting head assembly is rotated by said rotating power device.

18. Pipe machining apparatus as set forth in claim 17 in which at least a portion of said cylindrical mast is hollow, elongated slots being provided in opposite walls of said hollow portion of said mast and through which a transverse member passes for connection with said sleeve member, said transverse member also being operatively attached to said another power device for limited movement in said elongated slots to effect said axial movement of said cutting head assembly.

19. Pipe machining apparatus as set forth in claim 18 in which said transverse member is connected through said hollow portion of said mast to said another power device by an elongated rod.

20. Pipe machining apparatus as set forth in claim 19 in which said another power device includes a ball screw actuator attached to said elongated rod and by which rotational movement is translated to axial movement of said elongated rod.

* * * * *